(12) United States Patent
Kusase

(10) Patent No.: US 10,862,355 B2
(45) Date of Patent: Dec. 8, 2020

(54) ARMATURE WITH A CORE HAVING TEETH OF DIFFERENT CIRCUMFERENTIAL WIDTHS AND ELECTRIC MOTOR INCLUDING THE ARMATURE AND A ROTOR

(71) Applicant: DENSO CORPORATION, Kariya (JP)

(72) Inventor: Shin Kusase, Kariya (JP)

(73) Assignee: DENSO CORPORATION, Kariya (JP)

( * ) Notice: Subject to any disclaimer, the term of this patent is extended or adjusted under 35 U.S.C. 154(b) by 499 days.

(21) Appl. No.: 15/718,622

(22) Filed: Sep. 28, 2017

(65) Prior Publication Data
US 2018/0102678 A1   Apr. 12, 2018

(30) Foreign Application Priority Data
Oct. 7, 2016   (JP) .................. 2016-198918

(51) Int. Cl.
  *H02K 1/14*   (2006.01)
  *H02K 1/16*   (2006.01)
  *H02K 1/12*   (2006.01)
(52) U.S. Cl.
  CPC ............... *H02K 1/12* (2013.01); *H02K 1/146* (2013.01); *H02K 1/16* (2013.01)
(58) Field of Classification Search
  CPC .. H02K 1/06; H02K 1/08; H02K 1/12; H02K 1/14; H02K 1/146; H02K 1/16; H02K 3/12; H02K 3/16; H02K 3/48
  USPC .......... 310/179, 195, 198, 216.001, 216.071, 310/216.072, 216.073, 216.074, 216.092, 310/216.094, 216.097, 216.111, 216.112
  See application file for complete search history.

(56) References Cited

U.S. PATENT DOCUMENTS

| | | | | |
|---|---|---|---|---|
| 2004/0251763 A1* | 12/2004 | Tamaki | ............... | H02K 1/2766 310/156.53 |
| 2008/0290751 A1* | 11/2008 | Hwang | ................. | H02K 1/146 310/156.01 |
| 2014/0091664 A1* | 4/2014 | Aoyama | .............. | H02K 1/2766 310/156.53 |

(Continued)

FOREIGN PATENT DOCUMENTS

| CN | 203617796 U | 5/2014 |
|---|---|---|
| CN | 104821697 A | 8/2015 |

(Continued)

*Primary Examiner* — Jue Zhang
*Assistant Examiner* — David A. Singh
(74) *Attorney, Agent, or Firm* — Oliff PLC

(57) ABSTRACT

An armature includes a multi-phase armature coil and an armature core. The armature core includes a back yoke, a plurality of large-width teeth and a plurality of small-width teeth having a smaller circumferential width than the large-width teeth. The large-width teeth each radially protrude from the back yoke and are spaced from one another in a circumferential direction of the armature core. The large-width teeth have the armature coil concentratedly wound thereon. The small-width teeth each radially protrude from the back yoke and are spaced from one another in the circumferential direction of the armature core. The small-width teeth are arranged alternately with the large-width teeth in the circumferential direction of the armature core. Moreover, 1≤W1/W2≤2, where W1 is a radial width of the back yoke and W2 is the circumferential width of the small-width teeth.

15 Claims, 6 Drawing Sheets

(56) References Cited

U.S. PATENT DOCUMENTS

2015/0171678 A1* 6/2015 Tsutsui ................ H02K 1/2766
                                                    310/156.56
2016/0172949 A1* 6/2016 Matsuoka .............. H02K 21/16
                                                    310/195

FOREIGN PATENT DOCUMENTS

| JP | S60-48374 U   | 4/1985  |
|----|---------------|---------|
| JP | S61-94547 A   | 5/1986  |
| JP | H08-308198 A  | 11/1996 |
| JP | 2005-020807 A | 1/2005  |
| JP | 2010-273458 A | 12/2010 |

* cited by examiner

ARMATURE WITH A CORE HAVING TEETH OF DIFFERENT CIRCUMFERENTIAL WIDTHS AND ELECTRIC MOTOR INCLUDING THE ARMATURE AND A ROTOR

CROSS-REFERENCE TO RELATED APPLICATION

This application is based on and claims priority from Japanese Patent Application No. 2016-198918 filed on Oct. 7, 2016, the content of which is hereby incorporated by reference in its entirety into this application.

BACKGROUND

1 Technical Field

The present invention relates to an armature that includes an armature core and a multi-phase armature coil, and to a rotating electric machine that includes the armature.

2 Description of Related Art

There are known two different manners of winding a multi-phase armature coil of a rotating electric machine on teeth of an armature core, namely full-pitch winding and short-pitch winding (or fractional-pitch winding). The full-pitch winding is a winding manner in which the pitch at which each phase winding of the armature coil is received in slots of the armature core is equal to one magnetic pole pitch. The full-pitch winding has an advantage of making it possible to secure high performance (e.g., high torque) of the rotating electric machine. However, at the same time, the full-pitch winding also has a disadvantage such that the winding process is complicated, increasing the manufacturing cost and resulting in a long overall length of the armature coil. In contrast, the short-pitch winding is a winding manner in which the pitch at which each phase winding of the armature coil is received in the slots of the armature core is shorter than one magnetic pole pitch. The short-pitch winding has an advantage of resulting in a short overall length of the armature coil. However, at the same time, the short-pitch winding also has a disadvantage such that the winding factor is low, making it difficult to effectively utilize magnetic flux and secure high performance of the rotating electric machine.

Japanese Patent Application Publication No. JP2010273458A discloses a three-phase rotating electric machine that can be easily assembled without any inter-phase insulation while suppressing its performance from being lowered. The three-phase rotating electric machine includes an armature core that has a plurality of first teeth and a plurality of second teeth having a greater minimum width than the first teeth. The number of the first teeth is set to be equal to the number of the second teeth. The first teeth are arranged alternately with the second teeth in a circumferential direction of the armature core. The second teeth have a multi-phase armature coil concentratedly wound thereon (or wound thereon in a concentrated winding manner), whereas the first teeth have no coil wound thereon.

However, the above patent document fails to disclose or even suggest the effect of the radial width (or thickness) of a back yoke of the armature core on the performance of the three-phase rotating electric machine. It can be estimated, from the drawings of the above patent document, that the radial width of the back yoke is about 4.5 times greater than the circumferential width of the first teeth. Consequently, with the large radial width of the back yoke, it would be difficult for magnetic flux, which is generated upon energization of the armature coil wound on the second teeth, to flow to the first teeth; thus it would be easy for leakage magnetic flux to occur. As a result, the amount of magnetic flux flowing between the first teeth and a rotor of the three-phase rotating electric machine would be extremely small, making it difficult to obtain reluctance torque.

SUMMARY

According to exemplary embodiments, there is provided an armature which includes a multi-phase armature coil and an armature core. The armature core includes a back yoke, a plurality of large-width teeth and a plurality of small-width teeth having a smaller circumferential width than the large-width teeth. The large-width teeth each radially protrude from the back yoke and are spaced from one another in a circumferential direction of the armature core. The large-width teeth have the armature coil concentratedly wound thereon. The small-width teeth each radially protrude from the back yoke and are spaced from one another in the circumferential direction of the armature core. The small-width teeth are arranged alternately with the large-width teeth in the circumferential direction of the armature core. Moreover, $1 \leq W1/W2 \leq 2$, where $W1$ is a radial width of the back yoke and $W2$ is the circumferential width of the small-width teeth.

The armature is designed to be used in a rotating electric machine which further includes a rotor disposed to face the armature through a gap formed therebetween.

With the above configuration of the armature, it is easy for magnetic flux, which is generated upon energization of the armature coil wound on the large-width teeth, to flow to the small-width teeth via the back yoke, reducing leakage magnetic flux. Consequently, the amount of magnetic flux flowing between the small-width teeth and the rotor of the rotating electric machine is increased, making it easy to obtain reluctance torque. As a result, it is possible to increase the total torque of the rotating electric machine.

BRIEF DESCRIPTION OF THE DRAWINGS

The present invention will be understood more fully from the detailed description given hereinafter and from the accompanying drawings of exemplary embodiments, which, however, should not be taken to limit the present invention to the specific embodiments but are for the purpose of explanation and understanding only.

In the accompanying drawings.

DESCRIPTION OF EMBODIMENTS

Figure 1:
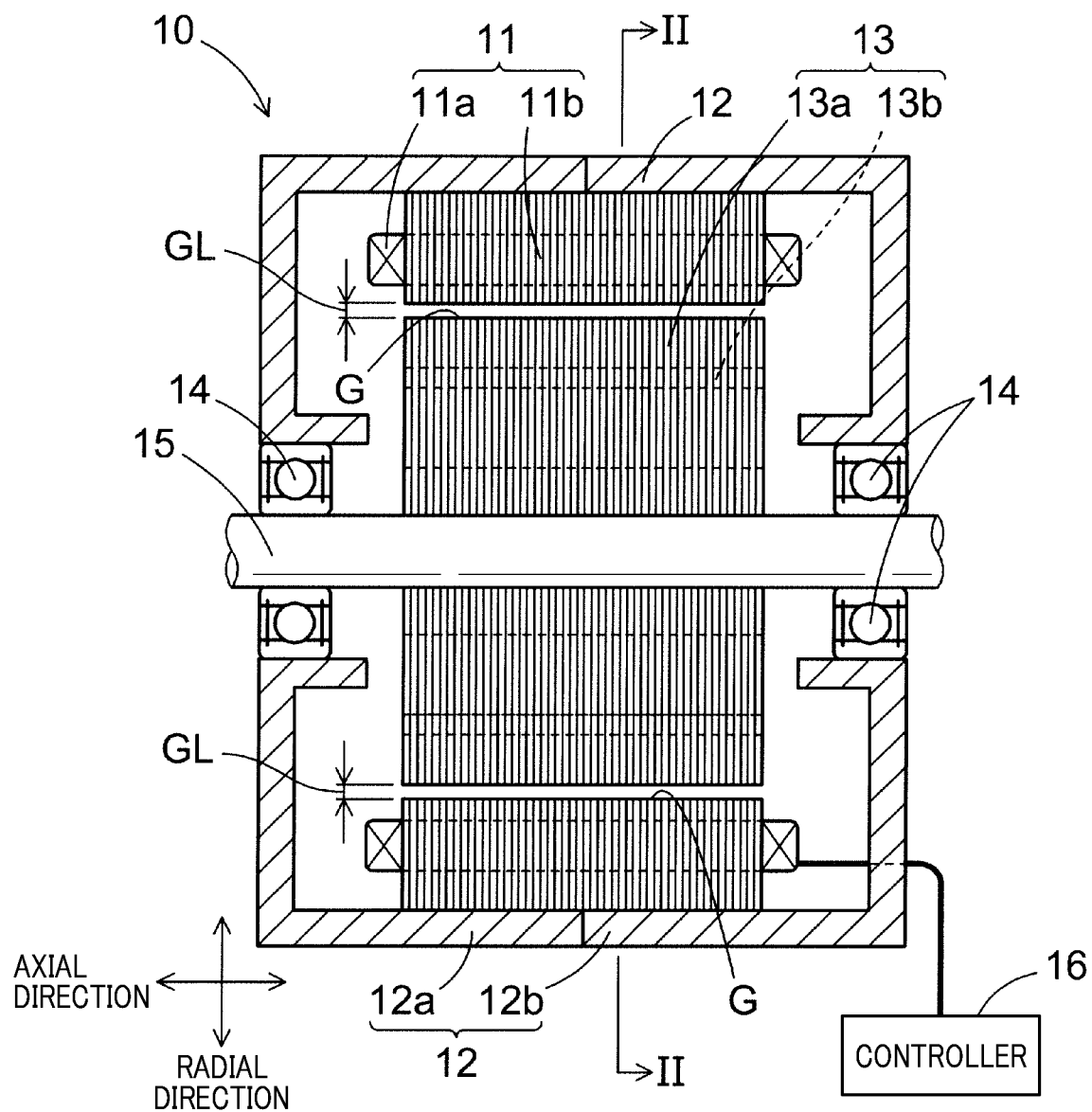
FIG. 1 is a schematic cross-sectional view of a rotating electric machine according to a first embodiment.

Exemplary embodiments will be described hereinafter with reference to FIGS. 1-11. It should be noted that for the sake of clarity and understanding, identical components having identical functions throughout the whole description have been marked, where possible, with the same reference numerals in each of the figures and that for the sake of avoiding redundancy, descriptions of identical components will not be repeated.

First Embodiment

FIG. 1 shows the overall configuration of a rotating electric machine 10 according to a first embodiment.

In the present embodiment, the rotating electric machine 10 is configured as an inner-rotor IPM (Interior Permanent Magnet) motor for use in, for example, a motor vehicle.

As shown in FIG. 1, the rotating electric machine 10 includes an armature (or stator) 11, a rotor 13, a pair of bearings 14 and a rotating shaft 15, all of which are received in a frame (or housing) 12. Moreover, the rotating electric machine 10 also includes a controller 16 which may be provided either outside the frame 12 (see FIG. 1) or inside the frame 12 (not shown).

The frame 12 may be formed of any suitable material into any suitable shape. The frame 12 supports and fixes thereto, at least, the armature 11. Moreover, the frame 12 rotatably supports the rotating shaft 15 via the pair of bearings 14.

For example, in the present embodiment, the frame 12 is formed of a nonmagnetic material and includes a pair of cup-shaped frame pieces 12a and 12b which are fixed together at the open ends thereof. In addition, the frame pieces 12a and 12b may be fixed together by fixing members (e.g., bolts, screws or fixing pins) or by welding. It should be appreciated that the frame 12 may also be formed into one piece.

The armature 11 includes a multi-phase armature coil (or stator coil) 11a and an armature core (or stator core) 11b on which the armature coil 11a is wound.

In the present embodiment, the armature coil 11a is configured as a three-phase coil. The armature coil 11a may be formed of either a single continuous conductor wire or a plurality of conductor wires (or conductor segments) that are electrically connected with each other.

Figure 2:
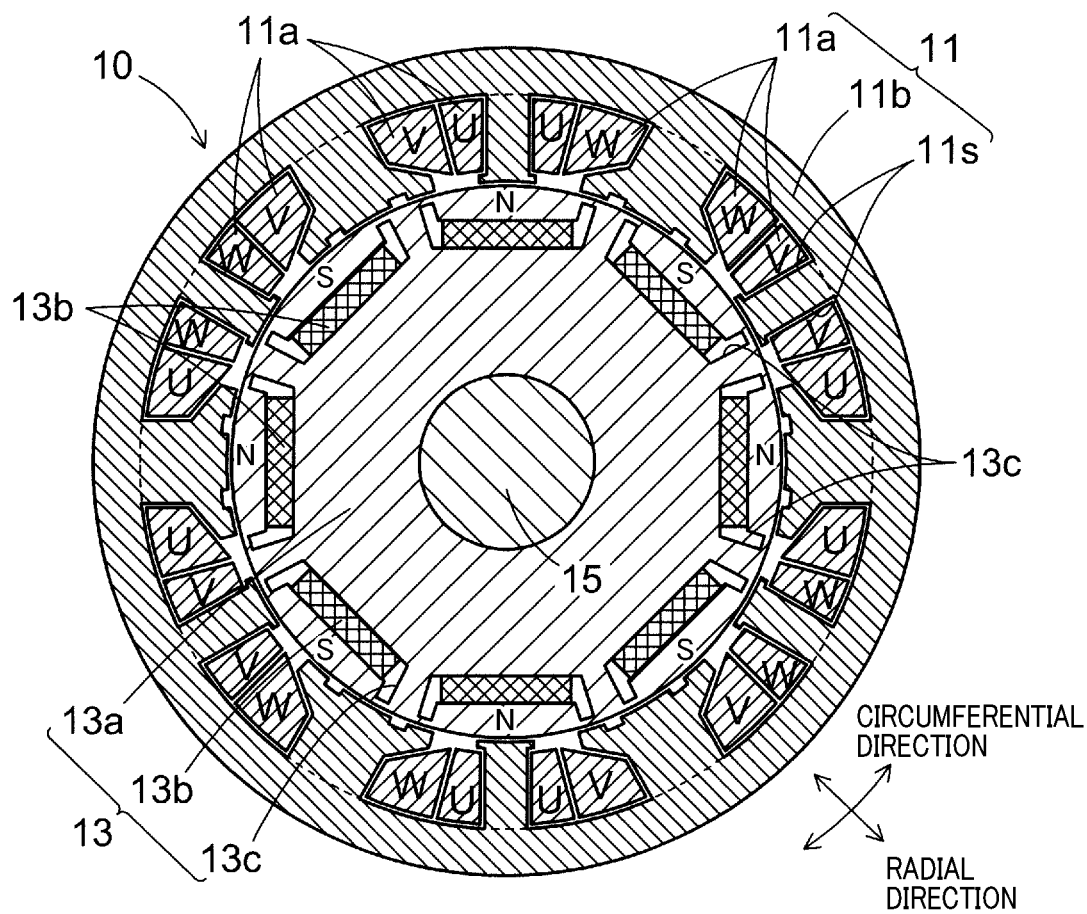
FIG. 2 is a cross-sectional view, taken along the line II-II in FIG. 1, of the rotating electric machine omitting a frame thereof.

As shown in FIG. 2, the armature core 11b is annular (or hollow cylindrical) in shape and has a plurality of slots 11s formed therein. Each of the slots 11s extends in an axial direction of the armature core 11b so as to penetrate the armature core 11b in the axial direction. Moreover, the slots 11s are spaced from one another in a circumferential direction of the armature core 11b at predetermined intervals.

The armature core 11b may be formed of any suitable material using any suitable method. For example, in the present embodiment, the armature core 11b is formed by laminating a plurality of magnetic steel sheets in the axial direction of the armature core 11b.

Figure 3:
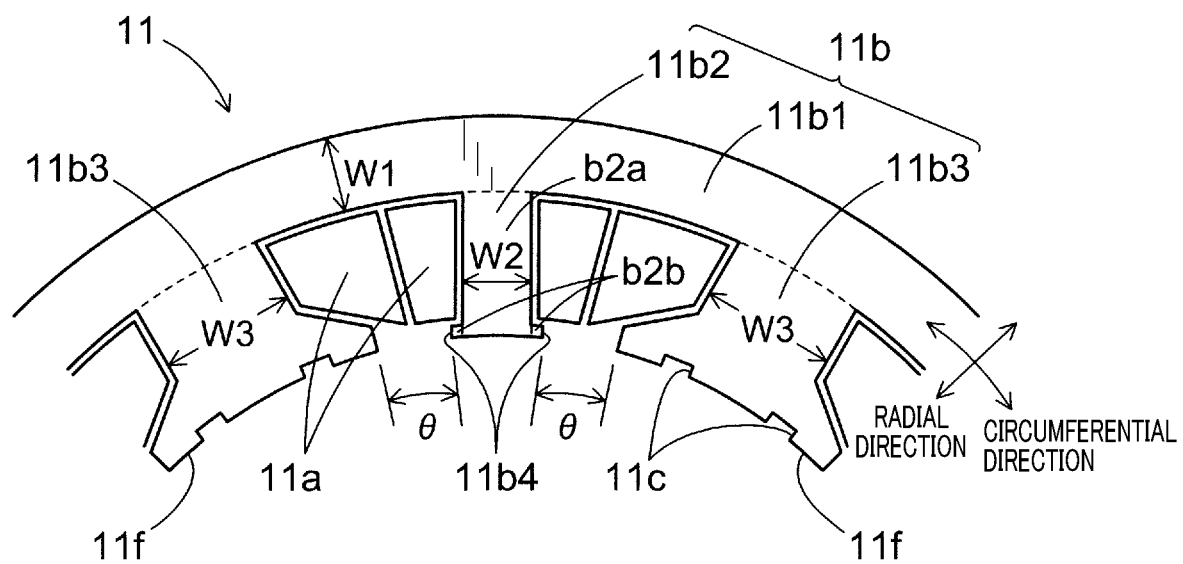
FIG. 3 is a schematic view illustrating the radial width $W1$ of a back yoke of an armature core, the circumferential width $W2$ of small-width teeth of the armature core and the circumferential width $W3$ of large-width teeth of the armature core in the rotating electric machine according to the first embodiment.

The armature coil 11a is wound on the armature core 11b so as to be received in the slots 11s. The armature coil 11a may have any suitable cross-sectional shape, such as a rectangular, circular or triangular cross-sectional shape. In the present embodiment, the armature coil 11a is concentratedly wound on teeth (i.e., small-width teeth 11b2 and large-width teeth 11b3 as shown in FIG. 3) of the armature core 11b in the manner of an alpha winding. Here, the alpha winding is a winding manner in which both lead wires respectively at winding-start and winding-finish ends of the armature coil 11a are located on a radial side (more specifically, on the radially outer side in the present embodiment) of the armature coil 11a. In addition, the teeth of the armature core 11b will be described in detail later.

The rotor 13 is disposed radially inside the armature core 11b so as to face a radially inner periphery of the armature core 11b. The rotor 13 is fixed on the rotating shaft 15 so as to rotate together with the rotating shaft 15. The configuration of the rotor 13 will be described in detail later.

Referring back to FIG. 1, between the rotor 13 and the armature 11, there is formed a radial gap G The size (or radial width) GL of the radial gap G may be set to any suitable value such that magnetic flux can flow between the rotor 13 and the armature 11.

The controller 16 performs, for example, a power running control and a regenerative braking control. In the power running control, the controller 16 controls multi-phase (e.g., three-phase in the present embodiment) alternating current supplied to the armature coil 11a. In the regenerative braking control, the controller 16 controls the output of electromotive force generated in the armature coil 11a to, for example, a rechargeable battery or an electrical load provided in the vehicle.

Next, the configuration of the rotor 13 will be described in detail with reference to FIG. 2.

In the present embodiment, the rotor 13 includes a cylindrical rotor core 13a and a plurality of permanent magnets 13b, but no field winding.

The rotor core 13a has a plurality of magnet-receiving holes 13c that are formed in the vicinity of a radially outer periphery of the rotor core 13a so as to be spaced from one another at predetermined intervals in the circumferential direction of the rotor core 13a. The rotor core 13a also has a shaft hole formed along its central axis; in the shaft hole, there is fixedly fitted the rotating shaft 15. In other words, the rotor core 13a is fixedly fitted on an outer periphery of the rotating shaft 15.

The rotor core 13a may be formed of any suitable material using any suitable method. For example, in the present embodiment, the rotor core 13a is formed by laminating a plurality of magnetic steel sheets in the axial direction of the rotor core 13a (see FIG. 1).

Each of the permanent magnets 13b has the shape of a quadrangular prism with a rectangular cross section perpendicular to its axis. Moreover, each of the permanent magnets 13b is received in a corresponding one of the magnet-receiving holes 13c of the rotor core 13a so that the longer sides of the rectangular cross section of the permanent magnet 13b extend perpendicular to a radial direction of the rotor core 13a.

The permanent magnets 13b are each radially magnetized so that for each circumferentially-adjacent pair of the permanent magnets 13b, the polarities of radially outer side surfaces of the permanent magnets 13b of the circumferentially-adjacent pair are opposite to each other. Consequently, radially outer peripheral parts of the rotor core 13a, each of which is located radially outside and magnetized by one of the permanent magnets 13b, respectively constitute magnetic poles of the rotor 13; the polarities of the magnetic poles alternate between N (North) and S (South) in the circumferential direction of the rotor core 13a.

In addition, the number of the permanent magnets 13b embedded in the rotor core 13a (more specifically, received in the magnet-receiving holes 13c of the rotor core 13a) may be suitably set according to the rating and design specification of the rotating electric machine 10. In the present embodiment, the number of the permanent magnets 13b is set to, for example, 8.

Next, the configuration of the armature 11 will be described in detail with reference to FIGS. 2-4.

In the present embodiment, as shown in FIG. 3, the armature core 11b has a back yoke 11b1, a plurality of small-width teeth 11b2 and a plurality of large-width teeth 11b3. In addition, as shown in FIG. 2, both the number of the small-width teeth 11b2 and the number of the large-width teeth 11b3 are set to 6 in the present embodiment.

The back yoke 11b1 has an annular (or hollow cylindrical) shape. The small-width teeth 11b2 each protrude radially inward from the back yoke 11b1 and are circumferentially spaced from one another at predetermined intervals. Similarly, the large-width teeth 11b3 each protrude radially inward from the back yoke 11b1 and are circumferentially spaced from one another at predetermined intervals. Moreover, the small-width teeth 11b2 are arranged alternately with the large-width teeth 11b3 in the circumferential direction of the armature core 11b (i.e., the circumferential direction of the annular back yoke 11b1).

In addition, as mentioned previously, in the present embodiment, the armature core 11b is formed by laminating a plurality of magnetic steel sheets in the axial direction of the armature core 11b. Consequently, all of the back yoke 11b1, the small-width teeth 11b2 and the large-width teeth 11b3 are integrally formed into one piece.

The armature coil 11a is concentratedly wound on both the small-width teeth 11b2 and the large-width teeth 11b3. In the present embodiment, the armature coil 11a is configured as a three-phase coil which is comprised of, for example, U-phase, V-phase and W-phase windings. The U-phase, V-phase and W-phase windings of the armature coil 11a are sequentially arranged in the circumferential direction of the armature core 11b in a phase sequence of U, V and W.

More particularly, in the present embodiment, as shown in FIG. 2, the U-phase, V-phase and W-phase windings of the armature coil 11a are sequentially and repeatedly arranged counterclockwise in the phase sequence of U, V and W. However, it should be noted that though not shown in the drawings, the U-phase, V-phase and W-phase windings of the armature coil 11a may also be sequentially and repeatedly arranged clockwise in the phase sequence of U, V and W. In addition, each of the U-phase, V-phase and W-phase windings of the armature coil 11a is electrically connected to the controller 16.

In the present embodiment, to improve the total torque T of the rotating electric machine 10, the following relationship is satisfied: $0 < N2 \le N1$, where N1 is the number of turns of the armature coil 11a on each of the large-width teeth 11b3 and N2 is the number of turns of the armature coil 11a on each of the small-width teeth 11b2.

Moreover, since the armature coil 11a is received in the slots 11s of the armature core 11b, N1 and N2 are also subject to the following relationship: $(N1+N2) \times S1 \le S2$, where S1 is the cross-sectional area of each part of the armature coil 11a constituting one turn and S2 is the cross-sectional area of each of the slots 11s.

Figure 4:
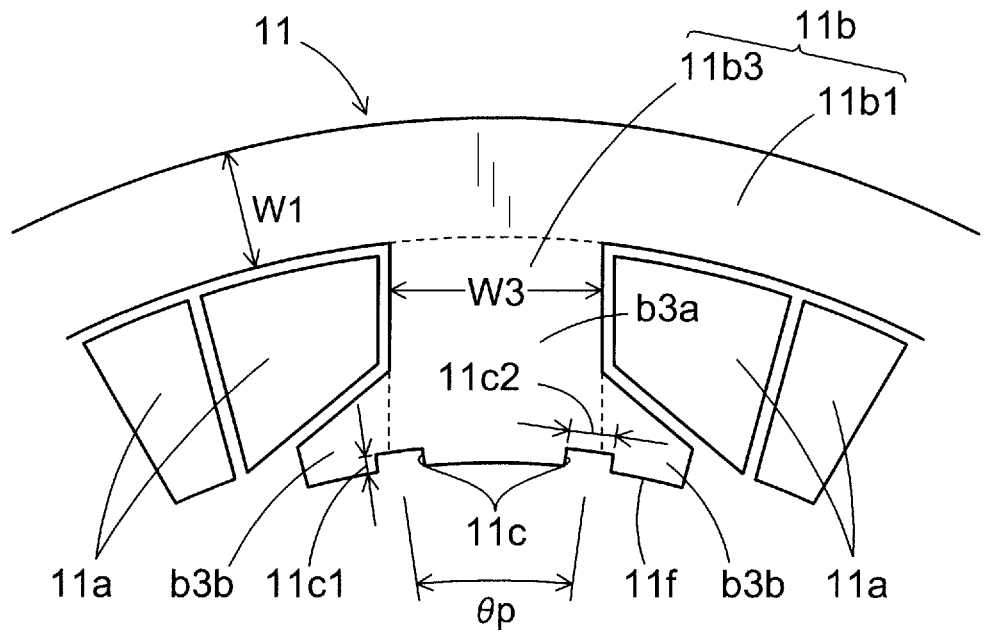
FIG. 4 is a schematic view illustrating the angular pitch $\theta p$ between grooves formed in each of the large-width teeth of the armature core.

Referring to FIGS. 3 and 4, in the armature core 11b, the back yoke 11b1 has a radial width (or thickness) W1. Each of the small-width teeth 11b2 has a circumferential width W2. As shown in FIG. 3, the circumferential width W2 is represented by the circumferential width of a main body b2a of the small-width tooth 11b2 and thus does not include the widths of two collar portions b2b that are formed at a distal end (or radially inner end) of the small-width tooth 11b2 to extend respectively toward opposite sides in the circumferential direction of the armature core 11b. On the other hand, each of the large-width teeth 11b3 has a circumferential width W3. As shown in FIG. 4, the circumferential width W3 is represented by the circumferential width of a main body b3a of the large-width tooth 11b3 and thus does not include the widths of two collar portions b3b that are formed at a distal end (or radially inner end) of the large-width tooth 11b3 to extend respectively toward opposite sides in the circumferential direction of the armature core 11b. In addition, the relationships between W1, W2 and W3 will be described in detail later.

Moreover, as shown in FIGS. 2-4, each of the slots 11s is formed between one circumferentially-adjacent pair of the small-width and large-width teeth 11b2 and 11b3 and has an opening 11b4 at a radially inner end thereof (i.e., a radial end thereof on the opposite side to the back yoke 11b1).

In the present embodiment, the following relationship is satisfied:

$$180°/(p \times m) \le \theta \le 360°/(p \times m)$$

where p is the number of poles, m is the number of phases and θ is an opening angle (or angular range) of each of the openings 11b4 of the slots 11s in mechanical angle.

Further, since m=3 in the present embodiment, the following relationship is satisfied: $60°/p \le \theta \le 120°/p$.

In addition, the opening angle θ is represented by the angular range of the opening 11b4 of each of the slots 11s (see FIG. 3).

Each of the large-width teeth 11b3 has at least one groove 11c formed in its distal end surface (or radially inner end surface) 11f which faces the rotor 13. More particularly, in the present embodiment, each of the large-width teeth 11b3 has two grooves 11c formed in its distal end surface 11f. Each of the grooves 11c extends in the axial direction of the armature core 11b (i.e., the direction perpendicular to the paper surface of FIG. 3) so as to penetrate the armature core 11b in the axial direction.

In addition, though not shown in the drawings, the number of the grooves 11c formed in each of the large-width teeth 11b3 may be set to 1, 3 or more.

Moreover, as shown in FIG. 4, in the case of forming a plurality of grooves 11c in each of the large-width teeth 11b3, the plurality of grooves 11c are circumferentially spaced from one another at an angular pitch θp in mechanical angle.

The angular pitch θp can be set by the following equation: θp=360°/(p×m), where p is the number of poles of the armature 11 (or the number of the magnetic poles of the rotor 13) and m is the number of phases of the armature coil 11a.

Further, since m=3 in the present embodiment, the angular pitch θp can be set by the following equation: θp=120°/p.

As shown in FIG. 4, each of the grooves 11c has a radial depth 11c1 and a circumferential width 11c2. To improve the rotational performance of the rotating electric machine 10, the radial depth 11c1 is set to be greater than or equal to the size GL of the radial gap G between the armature 11 and the rotor 13. That is, 11c1≥GL. Moreover, to improve the rotational performance of the rotating electric machine 10, the circumferential width 11c2 is set to be greater than or equal to twice the size GL of the radial gap G between the armature 11 and the rotor 13. That is, 11c2≥2GL.

Figure 5:
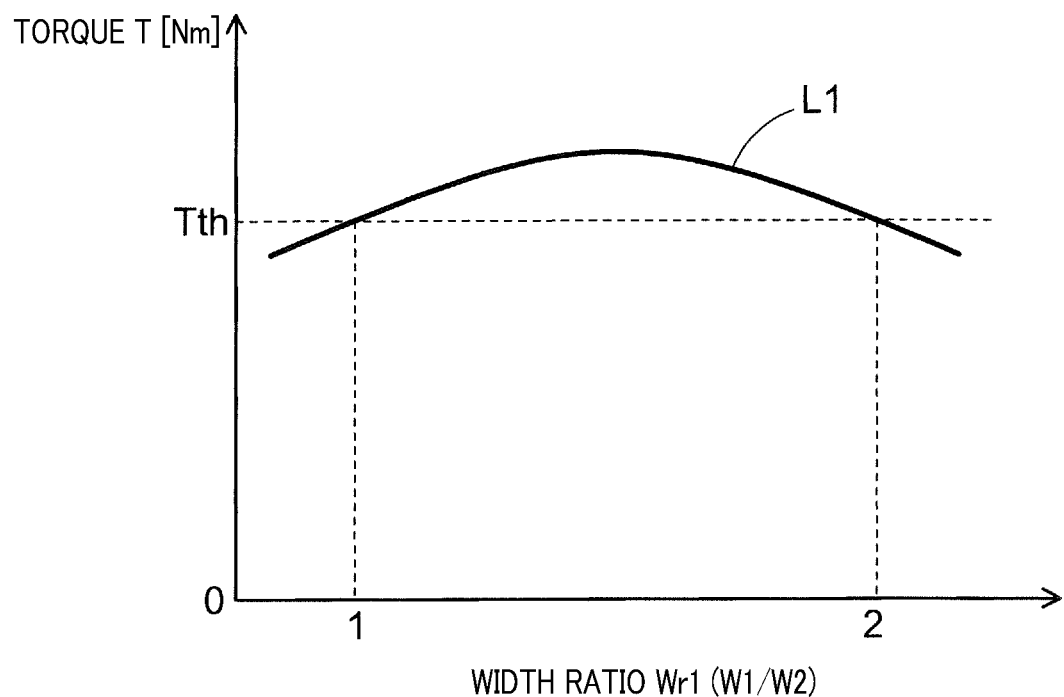
FIG. 5 is a graph illustrating the relationship between a width ratio Wr1 and the torque T of the rotating electric machine.

FIG. 5 illustrates the relationship between a width ratio Wr1 and the torque T of the rotating electric machine 10.

The width ratio Wr1 is the ratio of the radial width W1 of the back yoke 11b1 to the circumferential width W2 of the small-width teeth 11b2 in the armature core 11b. That is, Wr1=W1/W2.

In FIG. 5, the horizontal axis represents the width ratio Wr1 and the vertical axis represents the torque T. A characteristic line L1 represents the change in the torque T with the width ratio Wr1.

In addition, the relationship between the width ratio Wr1 and the torque T has been investigated in terms of maximizing the performance of the rotating electric machine 10 while keeping the external size of the rotating electric machine 10 constant, i.e., keeping the outer diameter of the armature core 11b constant.

It can be seen from FIG. 5 that when 1≤Wr1≤2, the torque T is higher than or equal to a threshold torque Tth. Here, the threshold torque Tth represents the maximum torque of a conventional rotating electric machine. Therefore, setting the width ratio Wr1 to be in the above range, it is possible to improve the torque T of the rotating electric machine 10 in comparison with the conventional rotating electric machine.

In addition, when Wr1<1 (i.e., W1<W2), the radial width W1 of the back yoke 11b1 is small and thus it is easy for magnetic flux saturation to occur in the back yoke 11b1. Consequently, the torque T of the rotating electric machine 10 becomes lower than the threshold torque Tth. On the other hand, when Wr1>2 (i.e., W1>2W2), the radial width W1 of the back yoke 11b1 is large and thus it becomes necessary to reduce the outer diameter of the rotor 13 (i.e., the outer diameter of the cylindrical rotor core 13a) for securing necessary space for the armature coil 11a. However, with the reduction in the outer diameter of the rotor 13, the magnetic field created by the rotor 13 is weakened and the rate of change in the magnetic field is lowered. Consequently, the torque T of the rotating electric machine 10 becomes lower than the threshold torque Tth.

Figure 6:
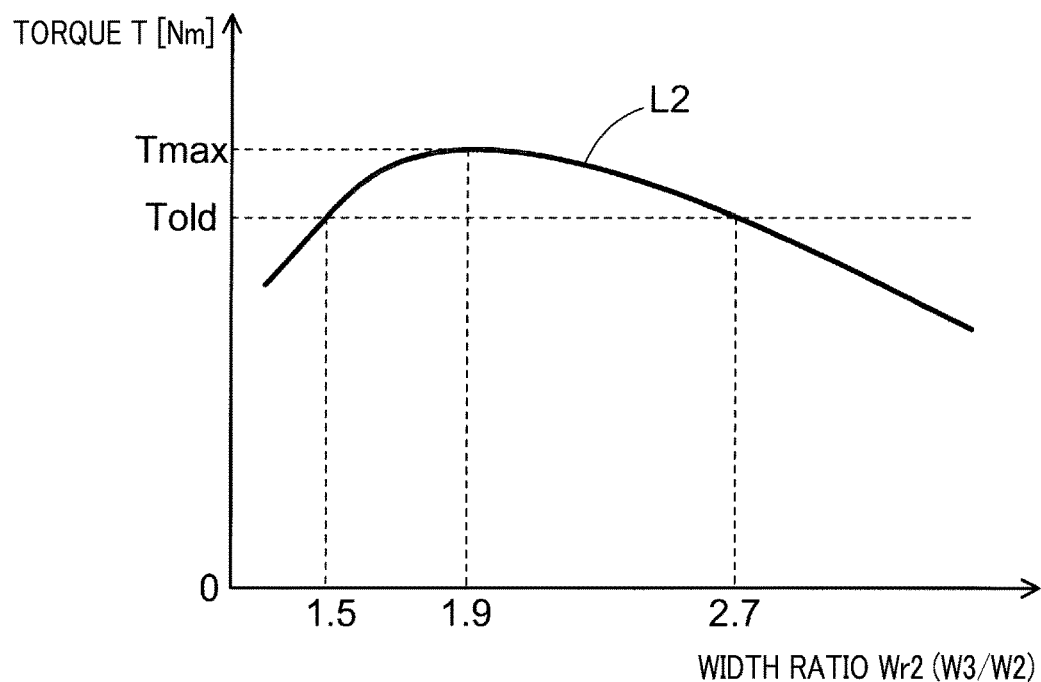
FIG. 6 is a graph illustrating the relationship between a width ratio Wr2 and the torque T of the rotating electric machine.

FIG. 6 illustrates the relationship between a width ratio Wr2 and the torque T of the rotating electric machine 10.

The width ratio Wr2 is the ratio of the circumferential width W3 of the large-width teeth 11b3 to the circumferential width W2 of the small-width teeth 11b2 in the armature core 11b. That is, Wr2=W3/W2.

In FIG. 6, the horizontal axis represents the width ratio Wr2 and the vertical axis represents the torque T. A characteristic line L2 represents the change in the torque T with the width ratio Wr2.

It can be seen from FIG. 6 that when 1.5≤Wr2≤2.7, the torque T is higher than or equal to a threshold torque Told.

Here, the threshold torque Told represents the maximum torque of a conventional rotating electric machine. Therefore, setting the width ratio Wr2 to be in the above range, it is possible to improve the torque T of the rotating electric machine 10 in comparison with the conventional rotating electric machine. Moreover, the results of a simulation revealed that the torque T has its maximum value Tmax when Wr2=1.9 and Tmax is higher than Told by about 30%.

In addition, when 1.5≤Wr2≤2.7, the magnetic flux generated by the permanent magnets 13b of the rotor 13 concentrates mainly on the large-width teeth 11b3, thereby enabling the armature 11 to function as a symmetric three-phase armature. However, when 1≤Wr2≤1.5, the difference between the circumferential width W2 of the small-width teeth 11b2 and the circumferential width W3 of the large-width teeth 11b3 is small. Consequently, the magnetic flux generated by the permanent magnets 13b of the rotor 13 is distributed to all of the small-width and large-width teeth 11b2 and 11b3, causing the armature 11 to lose its symmetry. As a result, the torque T of the rotating electric machine 10 becomes lower than the threshold torque Told. On the other hand, when Wr2>2.7, it is difficult for magnetic flux to flow to the small-width teeth 11b2, causing leakage magnetic flux to increase. As a result, the torque T of the rotating electric machine 10 becomes lower than the threshold torque Told.

Figure 7:
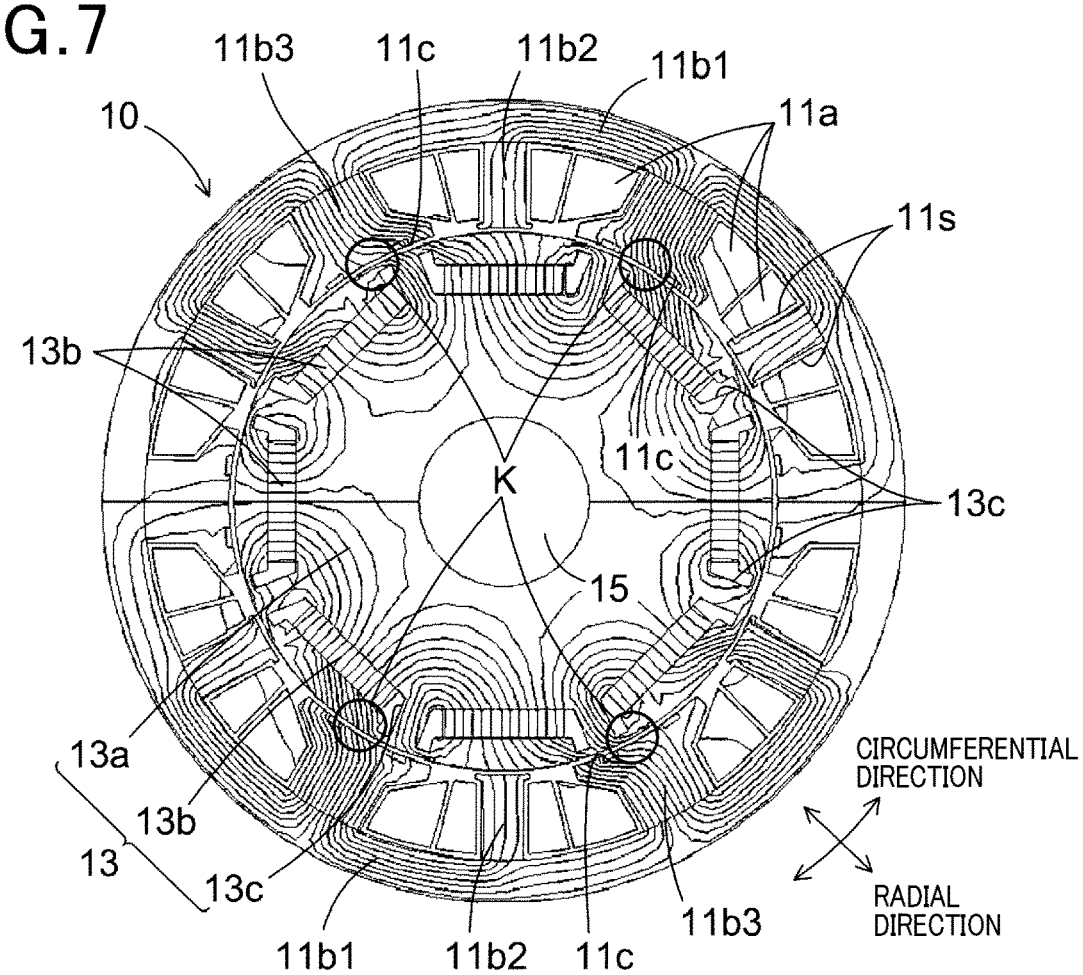
FIG. 7 is a schematic view illustrating the flow of magnetic flux in the rotating electric machine according to the first embodiment.

FIG. 7 shows the flow of magnetic flux in the rotating electric machine 10 when the rotor 13 rotates in, for example, the counterclockwise direction with armature current (or three-phase alternating current in the present embodiment) flowing in the armature coil 11a.

As shown in FIG. 7, in the rotating electric machine 10, for each of the magnetic poles of the rotor 13, a large amount of magnetic flux concentrates on that one of the small-width and large-width teeth 11b2 and 11b3 which is located obliquely opposite and forward of the magnetic pole in the rotational direction of the rotor 13 (i.e., the counterclockwise direction); in contrast, only a small amount of magnetic flux flows to that one of the small-width and large-width teeth 11b2 and 11b3 which is located directly opposite the magnetic pole. Magnetic flux lines, which can be regarded as a rubber string, exert an attractive force upon the action of a contraction force. Accordingly, the flow of magnetic flux shown in FIG. 7 indicates that in the rotating electric machine 10, the magnetic flux, the total amount of which is limited, is effectively used for generation of magnetic force in the rotational direction of the rotor 13, i.e., for generation of the torque T of the rotating electric machine 10. In addition, upon supply of the armature current to the armature coil 11a, a rotating magnetic field is created in the armature 11; the flow of magnetic flux shown in FIG. 7 also changes following the rotating magnetic field.

Moreover, as shown in FIG. 7, in the rotating electric machine 10, for each of the magnetic poles of the rotor 13, magnetic flux concentrates particularly on a non-grooved portion K between the two grooves 11c in that one of the small-width and large-width teeth 11b2 and 11b3 which is located obliquely opposite and forward of the magnetic pole in the rotational direction of the rotor 13. Therefore, it is clear that a large attractive force acts between the rotor 13 and the non-grooved portions K of the small-width and large-width teeth 11b2 and 11b3.

Figure 8:
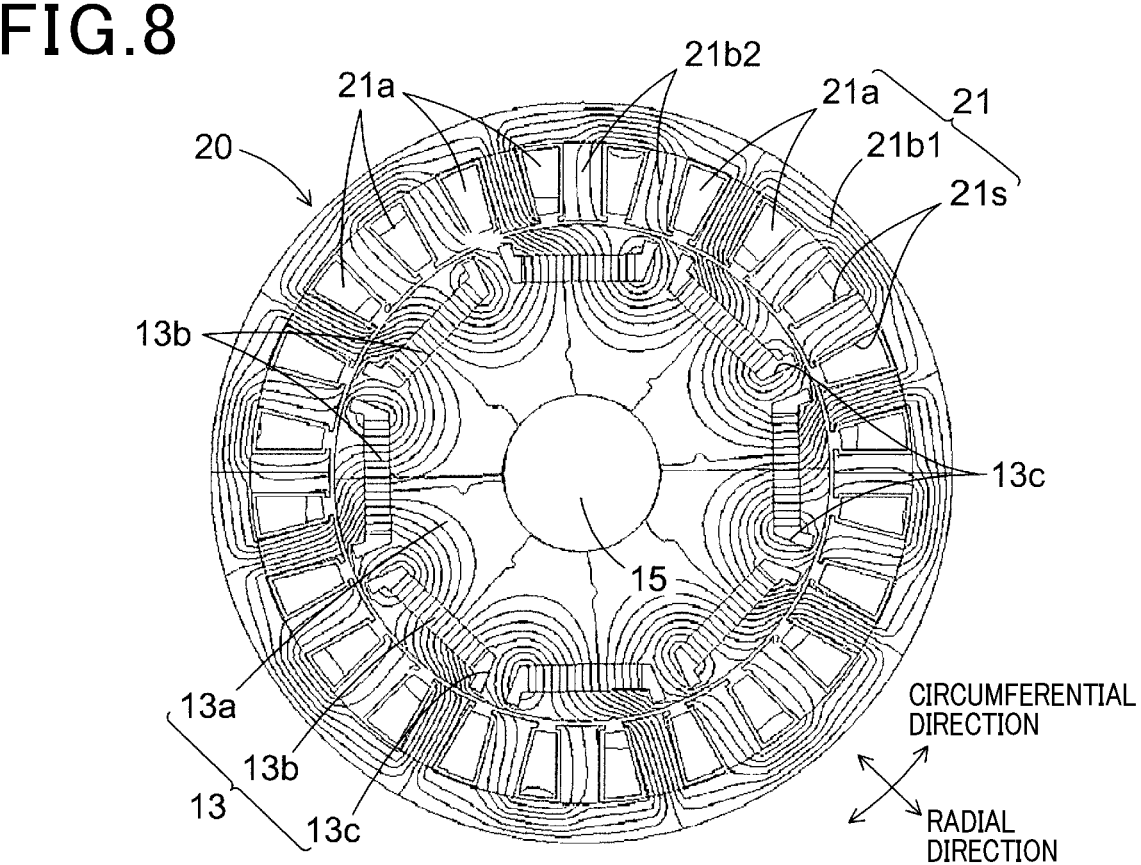
FIG. 8 is a schematic view illustrating the flow of magnetic flux in a conventional rotating electric machine.

FIG. 8 shows the flow of magnetic flux in a conventional rotating electric machine 20 when a rotor 13 of the machine 20 rotates in, for example, the counterclockwise direction with armature current flowing in an armature coil 21a of an armature 21 of the machine 20. In addition, the armature 21 has a plurality of teeth 21b2 all of which are identical to the small-width teeth 11b2 of the armature 11 according to the present embodiment; the armature coil 21a is wound in slots 21s of the armature 21 in a full-pitch distributed winding manner.

As shown in FIG. 8, in the conventional rotating electric machine 20, for each of the magnetic poles of the rotor 13, magnetic flux concentrates on that one of the teeth 21b2 which is located obliquely opposite and forward of the magnetic pole in the rotational direction of the rotor 13 (i.e., the counterclockwise direction). However, the number of those of the teeth 21b2 on which magnetic flux concentrates is only ⅓ of the number of those of the small-width and large-width teeth 11b2 and 11b3 on which magnetic flux concentrates in the rotating electric machine 10 according to the present embodiment. Moreover, for each of the magnetic poles of the rotor 13, magnetic flux also flows to both that one of the teeth 21b2 which is located directly opposite the magnetic pole and that one of the teeth 21b2 which is located obliquely opposite and backward of the magnetic pole in the rotational direction of the rotor 13. Therefore, the magnetic flux, the total amount of which is limited, is not effectively used for generation of the torque T. Consequently, the torque T of the conventional rotating electric machine 20 is lower than the torque T of the rotating electric machine 10 according to the present embodiment.

Figure 9:
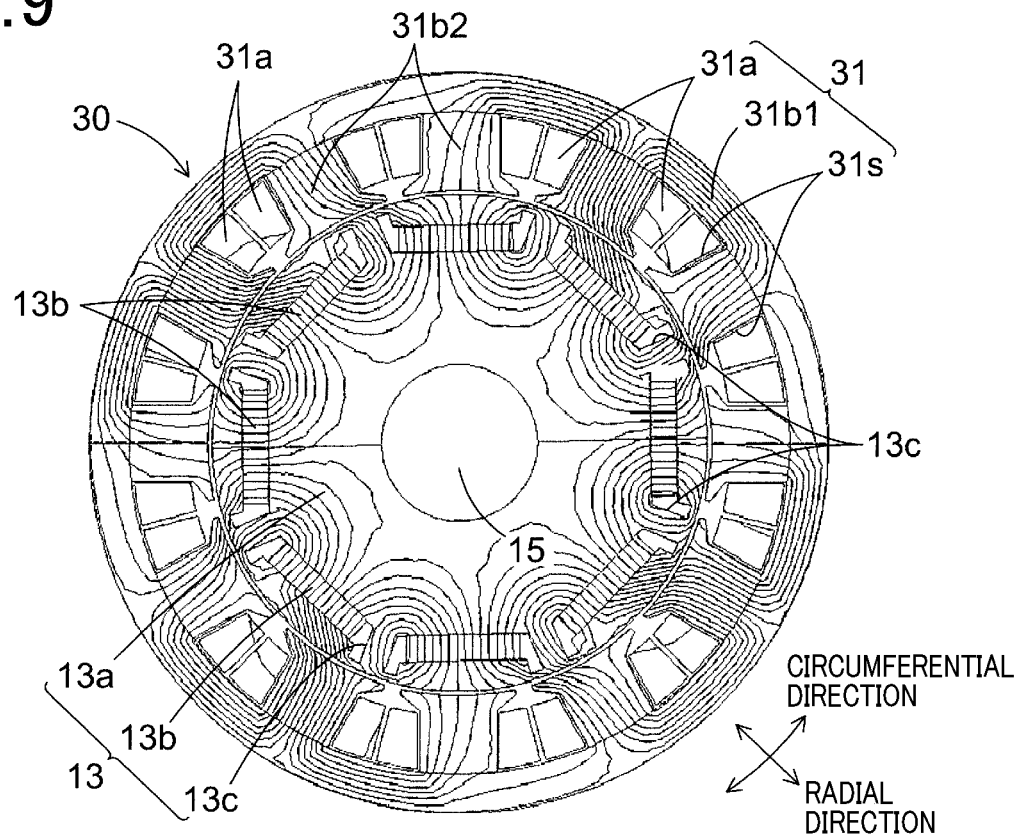
FIG. 9 is a schematic view illustrating the flow of magnetic flux in another conventional rotating electric machine.

FIG. 9 shows the flow of magnetic flux in a conventional rotating electric machine 30 when a rotor 13 of the machine 30 rotates in, for example, the counterclockwise direction with armature current flowing in an armature coil 31a of an armature 31 of the machine 30. In addition, the armature 31 has a plurality of teeth 31b2 all of which are identical to the large-width teeth 11b3 of the armature 11 according to the present embodiment; the armature coil 31a is wound in slots 31s of the armature 31 at a short pitch (or fractional pitch).

As shown in FIG. 9, in the conventional rotating electric machine 30, for each of the magnetic poles of the rotor 13, magnetic flux concentrates on that one of the teeth 31b2 which is located obliquely opposite and forward of the magnetic pole in the rotational direction of the rotor 13 (i.e., the counterclockwise direction). However, the ratio of the number of those of the teeth 31b2 on which magnetic flux concentrates to the total number of the teeth 31b2 is low. Moreover, for each of the magnetic poles of the rotor 13, magnetic flux also flows to that one of the teeth 31b2 which is located directly opposite the magnetic pole or obliquely opposite and backward of the magnetic pole in the rotational direction of the rotor 13. Therefore, the magnetic flux, the total amount of which is limited, is not effectively used for generation of the torque T. Consequently, the torque T of the conventional rotating electric machine 30 is lower than the torque T of the rotating electric machine 10 according to the present embodiment.

Figure 10:
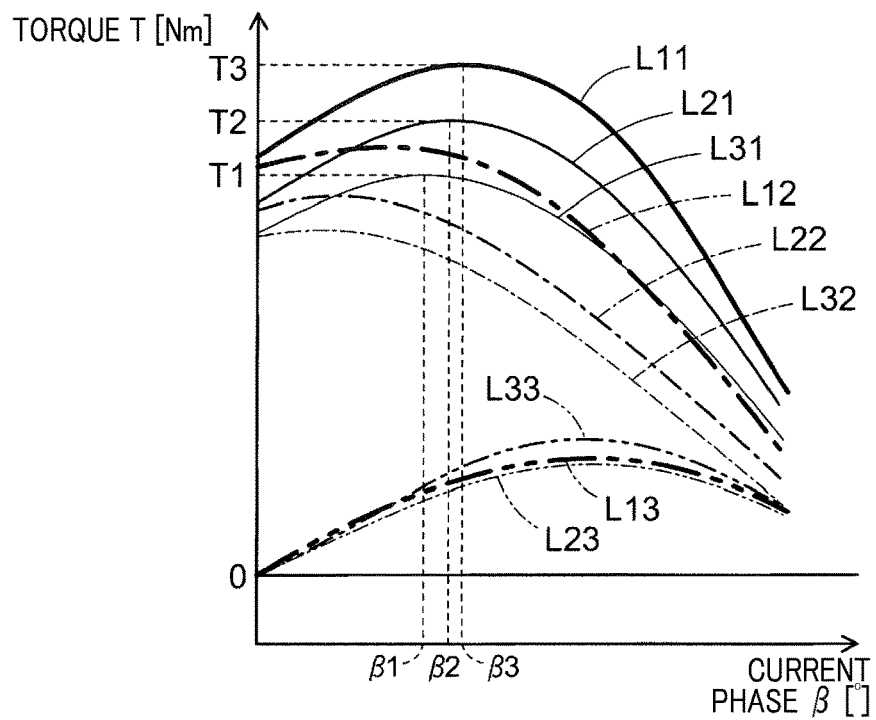
FIG. 10 is a graph showing a comparison in torque characteristics between the rotating electric machine according to the first embodiment and the conventional rotating electric machines.

FIG. 10 shows a comparison in torque characteristics between the rotating electric machine 10 according to the present embodiment and the conventional rotating electric machines 20 and 30. In addition, the torque characteristics of the rotating electric machines 10, 20 and 30 are obtained by performing a simulation for these machines under the same conditions.

In FIG. 10, the horizontal axis represents current phase $\beta$ and the vertical axis represents the torque T. Characteristic lines L11, L12 and L13 together represent the torque characteristics of the rotating electric machine 10 according to the present embodiment. More specifically, the characteristic line L11, which is drawn as a thick continuous line, represents the change in the total torque T of the rotating electric machine 10 with current phase $\beta$; the characteristic line L12, which is drawn as a thick one-dot chain line, represents the change in the magnet torque (i.e., the torque generated by the permanent magnets 13b) of the rotating electric machine 10 with current phase $\beta$; and the characteristic line L13, which is drawn as a thick two-dot chain line, represents the change in the reluctance torque of the rotating electric machine 10 with current phase $\beta$. Characteristic lines L21, L22 and L23 together represent the torque characteristics of the conventional rotating electric machine 20. More specifically, the characteristic line L21, which is drawn as a medium-thick continuous line, represents the change in the total torque T of the rotating electric machine 20 with current phase $\beta$; the characteristic line L22, which is drawn as a medium-thick one-dot chain line, represents the change in the magnet torque of the rotating electric machine 20 with current phase $\beta$; and the characteristic line L23, which is drawn as a medium-thick two-dot chain line, represents the change in the reluctance torque of the rotating electric machine 20 with current phase $\beta$. Characteristic lines L31, L32 and L33 together represent the torque characteristics of the conventional rotating electric machine 30. More specifically, the characteristic line L31, which is drawn as a thin continuous line, represents the change in the total torque T of the rotating electric machine 30 with current phase $\beta$; the characteristic line L32, which is drawn as a thin one-dot chain line, represents the change in the magnet torque of the rotating electric machine 30 with current phase $\beta$; and the characteristic line L33, which is drawn as a thin two-dot chain line, represents the change in the reluctance torque of the rotating electric machine 30 with current phase $\beta$.

As can be seen from FIG. 10, the total torque T of the rotating electric machine 10 has its maximum value T3 at a current phase $\beta3$ (see L11). The total torque T of the rotating electric machine 20 has its maximum value T2 at a current phase $\beta2$ (see L21). The total torque T of the rotating electric machine 30 has its maximum value T1 at a current phase $\beta1$ (see L31). Moreover, it is clear from FIG. 10 that T3>T2>T1.

The improvement in the total torque T according to the present embodiment is due to the improvement in the magnet torque. More specifically, in the rotating electric machine 10 according to the present embodiment, magnetic flux flows to the armature 11 through both the small-width teeth 11b2 and the large-width teeth 11b3. Comparing the magnet torques of the rotating electric machines 10, 20 and 30, it can be seen that L12>L22>L32. Moreover, the differences between the magnet torques of the rotating electric machines 10, 20 and 30 are large. On the other hand, comparing the reluctance torques of the rotating electric machines 10, 20 and 30, it can be seen that L33 is higher than L13 and L23 and the difference between L13 and L23 is small.

According to the present embodiment, it is possible to achieve the following advantageous effects.

In the present embodiment, the armature 11 includes the multi-phase armature coil 11a and the armature core 11b. The armature core 11b includes the back yoke 11b1, the large-width teeth 11b3 and the small-width teeth 11b2 having a smaller circumferential width than the large-width teeth 11b3. The large-width teeth 11b3 each protrude radially inward from the back yoke 11b1 and are spaced from one another in the circumferential direction of the armature core 11b. The large-width teeth 11b3 has the armature coil 11a concentratedly wound thereon (or wound thereon in a concentrated winding manner). The small-width teeth 11b2 each protrude radially inward from the back yoke 11b1 and are spaced from one another in the circumferential direction of the armature core 11b. The small-width teeth 11b2 are arranged alternately with the large-width teeth 11b3 in the circumferential direction of the armature core 11b. Moreover, in the armature core 11b, the following relationship is satisfied: 1≤W1/W2≤2, where W1 is the radial width of the back yoke 11b1 and W2 is the circumferential width of the small-width teeth 11b2 (see FIGS. 2-3 and 5).

With the above configuration, it is easy for magnetic flux, which is generated upon energization of the armature coil 11a wound on the large-width teeth 11b3, to flow to the small-width teeth 11b2 via the back yoke 11b1, reducing leakage magnetic flux. Consequently, the amount of magnetic flux flowing between the small-width teeth 11b2 and the rotor 13 is increased, making it easy to obtain the reluctance torque. As a result, it becomes possible to increase the total torque T of the rotating electric machine 10.

Moreover, in the present embodiment, the small-width teeth 11b2 also have the armature coil 11a concentratedly wound thereon. The armature coil 11a is comprised of the U-phase, V-phase and W-phase windings that are arranged, for example, in the phase sequence of U, V and W counterclockwise in the circumferential direction of the armature core 11b (see FIG. 2).

With the above configuration, since the armature coil 11a is wound on the small-width teeth 11b2 as well as on the large-width teeth 11b3, it is possible to increase the magnetomotive force generated in the armature core 11b upon energization of the armature coil 11a. Moreover, since the phase windings of the armature coil 11a are arranged in the phase sequence of U, V and W on the small-width and large-width teeth 11b2 and 11b3, it is easy to control the armature current (or three-phase alternating current in the present embodiment) supplied to the armature coil 11a.

In the present embodiment, the following relationship is also satisfied: 0≤N2≤N1, where N1 is the number of turns of the armature coil 11a on each of the large-width teeth 11b3 and N2 is the number of turns of the armature coil 11a on each of the small-width teeth 11b2.

Satisfying the above relationship, it is possible to secure large magnetomotive force generated in the large-width teeth 11b3 while allowing magnetomotive force to be generated in the small-width teeth 11b2 as well. Consequently, it is possible to increase the total torque T of the rotating electric machine 10.

In the present embodiment, the following relationship is also satisfied: 1.5≤W3/W2≤2.7, where W3 is the circumferential width of the large-width teeth 11b3 (see FIG. 6).

Satisfying the above relationship, it is possible to cause magnetic flux to optimally flow to the large-width teeth 11b3 and the small-width teeth 11b2, thereby reliably increasing the total torque T of the rotating electric machine 10.

In the present embodiment, each of the large-width teeth 11b3 has at least one groove 11c formed in the distal end surface (or radially inner end surface) 11f thereof so as to extend in the axial direction of the armature core 11 (see FIGS. 4 and 7).

With the above configuration, at the grooves 11c of the large-width teeth 11b3, magnetic reluctance is high and thus it is difficult for magnetic flux to flow therethrough; in contrast, at the non-grooved portions K of the large-width teeth 11b3, magnetic reluctance is low and thus it is easy for magnetic flux to flow therethrough. Therefore, when one of the magnetic poles of the rotor 13 arrives at one of the grooves 11c of the large-width teeth 11b3, an attractive force acts between the magnetic pole and that one of the non-grooved portions K of the large-width teeth 11b3, which is located immediately forward of the groove 11c in the rotational direction of the rotor 13, so as to have magnetic flux flow therebetween. Consequently, the rotational performance of the rotating electric machine 10 can be improved.

Moreover, in the present embodiment, for each of the large-width teeth 11b3, there are formed two grooves 11c in the distal end surface of the large-width tooth 11b3; the two grooves 11c are arranged in the circumferential direction of the armature core 11b at the angular pitch θp in mechanical angle (see FIG. 4). Moreover, θp=360°/(p×m), where p is the number of poles of the armature 11 and m is the number of phases of the armature coil 11a.

Setting the angular pitch θp as above, the grooves 11c can be suitably arranged according to the parameters p and m, thereby further improving the rotational performance of the rotating electric machine 10.

In the present embodiment, each of the grooves 11c formed in the distal end surfaces of the large-width teeth 11b3 has the radial depth 11c1 that is set to be greater than or equal to the size GL of the radial gap G between the armature 11 and the rotor 13 (see FIGS. 1 and 4).

Setting the radial depth 11c1 as above, it is possible to secure sufficiently high magnetic reluctance at the grooves 11c of the large-width teeth 11b3. Consequently, it is possible to secure a sufficiently large attractive force between the magnetic poles of the rotor 13 and the non-grooved portions K of the large-width teeth 11b3 located immediately forward of the respective grooves 11c in the rotational direction of the rotor 13, thereby reliably improving the rotational performance of the rotating electric machine 10.

In the present embodiment, each of the grooves 11c formed in the distal end surfaces of the large-width teeth 11b3 also has the circumferential width 11c2 that is set to be greater than or equal to twice the size GL of the radial gap G between the armature 11 and the rotor 13 (see FIGS. 1 and 4).

Setting the circumferential width 11c2 as above, it is possible to secure sufficiently high magnetic reluctance at the grooves 11c of the large-width teeth 11b3. Consequently, it is possible to secure a sufficiently large attractive force between the magnetic poles of the rotor 13 and the non-grooved portions K of the large-width teeth 11b3 located immediately forward of the respective grooves 11c in the rotational direction of the rotor 13, thereby reliably improving the rotational performance of the rotating electric machine 10.

In the present embodiment, the armature core 11b includes the slots 11s in which the armature coil 11a is received (see FIG. 2). Each of the slots 11s is formed between one circumferentially-adjacent pair of the small-width and large-width teeth 11b2 and 11b3 and has the opening 11b4 at the radially inner end thereof (i.e., the radial end thereof on the opposite side to the back yoke 11b1). Moreover, 180°/(p×m)≤θ≤360°/(p×m), where p is the number of poles of the armature 11, m is the number of phases of the armature coil 11a and θ is the opening angle of each of the openings 11b4 of the slots 11s in mechanical angle (see FIG. 3).

With the above configuration, it is possible to secure a sufficient space between each circumferentially-adjacent pair of the small-width and large-width teeth 11b2 and 11b3, thereby allowing the armature coil 11a to be easily concentratedly wound on the small-width and large-width teeth 11b2 and 11b3. Moreover, it is also possible to suppress leakage magnetic flux that flows directly between each circumferentially-adjacent pair of the small-width and large-width teeth 11b2 and 11b3.

In the present embodiment, the armature coil 11a is wound in the alpha winding manner so that both the lead wires respectively at the winding-start and winding-finish ends of the armature coil 11a are located on the radially outer side of the armature coil 11a.

With the above configuration, it is possible to secure a high space factor of the armature coil 11a in the slots 11s of the armature core 11b and increase the number of turns of the armature coil 11a on each of the small-width and large-width teeth 11b2 and 11b3, thereby increasing the magnetomotive force generated in the armature core 11b.

In the present embodiment, the rotating electric machine 10 includes the above-described armature 11 and the rotor 13 that is disposed to radially face the armature 11 through the radial gap G formed therebetween (see FIG. 1).

Consequently, it becomes possible to increase the amount of magnetic flux flowing between the armature 11 and the rotor 13 and thereby increase the total torque T of the rotating electric machine 10 in comparison with the conventional rotating electric machines 20 and 30.

Second Embodiment

This embodiment illustrates a rotating electric machine 10 which has almost the same structure as the rotating electric machine 10 according to the first embodiment. Accordingly, only the difference therebetween will be described hereinafter.

In the first embodiment, as described previously, the armature coil 11a is concentratedly wound on both the small-width teeth 11b2 and the large-width teeth 11b3 (see FIG. 1).

Figure 11:
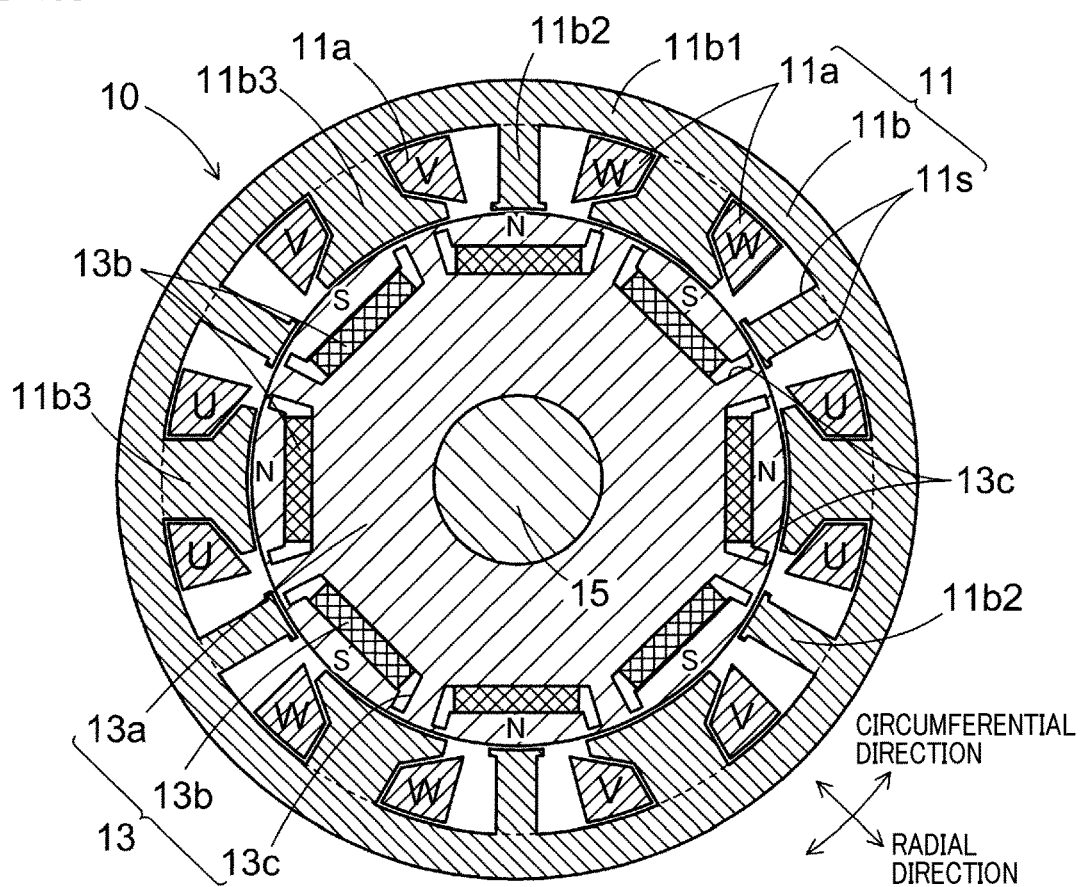
FIG. 11 is a cross-sectional view of a rotating electric machine according to a second embodiment omitting a frame thereof.

In contrast, in the present embodiment, as shown in FIG. 11, the armature coil 11a is concentratedly wound on only the large-width teeth 11b3. That is, no armature coil is wound on the small-width teeth 11b2.

Without winding the armature coil 11a on the small-width teeth 11b2, in each of the slots 11s of the armature core 11b, there is left a space which is otherwise occupied by the armature coil 11a wound on the small-width teeth 11b2. Consequently, it becomes possible to increase the number of turns of the armature coil 11a concentratedly wound on each of the large-width teeth 11b3. That is, the left space in each of the slots 11s of the armature core 11b is now occupied by the armature coil 11a wound on the large-width teeth 11b3. As a result, it becomes possible to increase the magnetomotive force generated in the large-width teeth 11b3 upon energization of the armature coil 11a.

While the above particular embodiments have been shown and described, it will be understood by those skilled in the art that various modifications, changes and improvements may be made without departing from the spirit of the present invention.

For example, in the above-described embodiments, the rotating electric machine 10 is configured as an inner-rotor rotating electric machine which has the rotor 13 disposed radially inside the armature 11 so as to face the radially inner periphery of the armature 11 (see FIGS. 1-2 and 11). However, the present invention may also be applied to an outer-rotor rotating electric machine which has a rotor disposed radially outside an armature (or stator) so as to face the radially outer periphery of the armature.

In the above-described embodiments, the rotating electric machine 10 is configured as a radial-gap rotating electric machine which has the armature 11 and the rotor 13 arranged to radially face each other through the radial gap G formed therebetween (see FIGS. 1-2 and 11). However, the present invention may also be applied to an axial-gap rotating electric machine which has an armature (or stator) and a rotor arranged to axially face each other through an axial gap formed therebetween.

In the above-described embodiments, the armature coil 11a is concentratedly wound on both the large-width teeth 11b3 and the small-width teeth 11b2 or only the large-width teeth 11b3 in the alpha winding manner. However, the armature coil 11a may also be wound in any other concentrated winding manner. For example, the armature coil 11a may be wound in a bundled manner in which n (here, n is an integer) conductor wires forming the armature coil 11a are bundled together and spirally wound on the teeth of the armature core 11b.

In the above-described embodiments, both the armature core 11b and the rotor core 13a are formed by axially laminating a plurality of magnetic steel sheets (see FIG. 1). However, at least one of the armature core 11b and the rotor core 13a may alternatively be formed by, for example, molding or machining a cylindrical magnetic material. Moreover, the cylindrical magnetic material may be machined by, for example, cutting, electrical discharge machining or laser beam machining.

In the above-described embodiments, both the number of the permanent magnets 13b and the number of the magnetic poles of the rotor 13 are set to 8. That is, each of the magnetic poles of the rotor 13 is formed by one of the permanent magnets 13b. However, the number of the permanent magnets 13b may also be set to be less than the number of the magnetic poles of the rotor 13. In this case, some (e.g. four) of the magnetic poles of the rotor 13 may be formed as consequent poles (or induced poles) while the remaining magnetic poles are formed by the permanent magnets 13b. In addition, the number of the magnetic poles of the rotor 13 may also be set to any other suitable number.

In the above-described embodiments, both the number of the small-width teeth 11b2 and the number of the large-width teeth 11b3 are set to 6, i.e., ¾ of the number of the magnetic poles of the rotor 13. However, in the case where the number of the magnetic poles of the rotor 13 is modified to a number other than 8, both the number of the small-width teeth 11b2 and the number of the large-width teeth 11b3 may be accordingly modified so as to be ¾ of the modified number of the magnetic poles of the rotor 13.

In the above-described embodiments, each of the permanent magnets 13b embedded in the rotor core 13a is formed in one piece. However, at least one of the permanent magnets 13b may alternatively be comprised of a plurality of permanent magnet segments.

In the above-described embodiments, the permanent magnets 13b each have the rectangular cross section and are embedded in the rotor core 13a so that for each of the permanent magnets 13b, the longer sides of the rectangular cross section of the permanent magnet 13b extend perpendicular to a radial direction of the rotor core 13a (see FIGS. 2 and 11). However, the permanent magnets 13b may alternatively have other cross-sectional shapes, such as a polygonal cross-sectional shape other than the rectangular cross-sectional shape (e.g., a triangular or pentagonal cross-sectional shape), a circular cross-sectional shape, an elliptical cross-sectional shape or a cross-sectional shape that is a combination of a plurality of different cross-sectional shapes. Moreover, the permanent magnets 13b may alternatively be embedded in the rotor core 13a in other postures, such as a posture of having the longer sides of the rectangular cross section extending parallel to the radial direction or a posture of having the longer sides of the rectangular cross section extending obliquely with respect to the radial direction.

In the above-described embodiments, the rotating electric machine 10 is configured as an IPM motor which has the permanent magnets 13b embedded in the rotor core 13a (more specifically, received in the magnet-receiving holes 13c of the rotor core 13a as shown in FIGS. 2 and 11). However, the present invention may also be applied to an SPM (Surface Permanent Magnet) motor which has permanent magnets attached on a peripheral surface of a rotor core radially facing an armature. In addition, in general, with an IPM motor, it is possible to realize high rotational speed and high torque; with an SPM motor, it is possible to increase effective magnetic flux and thereby reduce torque ripple.

In the above-described embodiments, the armature coil 11a is configured as a three-phase coil. However, the number of phases of the armature coil 11a may be greater than 3.

In the above-described embodiments, the armature coil 11a is comprised of the U-phase, V-phase and W-phase windings that are arranged in the phase sequence of U, V and W either counterclockwise or clockwise in the circumferential direction of the armature core 11b (see FIGS. 2 and 11). However, the U-phase, V-phase and W-phase windings of the armature coil 11a may also be arranged in other phase sequences, such as a phase sequence of U, W and V either counterclockwise or clockwise in the circumferential direction of the armature core 11b. Moreover, the armature coil 11a may alternatively be comprised of different phase windings, such as X-phase, Y-phase and W-phase windings in the case of the number of phases being equal to 3 or A-phase, B-phase, C-phase and D-phase windings in the case of the number of phases being equal to 4.

In the above-described embodiments, the rotating electric machine 10 is configured as an electric motor. However, the present invention may also be applied to other rotating electric machines, such as an electric generator or a motor-generator that can selectively function either as an electric motor or as an electric generator.

What is claimed is:

1. An armature comprising:
    a multi-phase armature coil; and
    an armature core including a back yoke, a plurality of large-width teeth and a plurality of small-width teeth having a smaller circumferential width than the large-width teeth, the large-width teeth each radially protruding from the back yoke and being spaced from one another in a circumferential direction of the armature core, the large-width teeth having the armature coil concentratedly wound thereon, the small-width teeth each radially protruding from the back yoke and being spaced from one another in the circumferential direction of the armature core, the small-width teeth being arranged alternately with the large-width teeth in the circumferential direction of the armature core such that there is one of the plurality of small-width teeth between each adjacent pair of the large-width teeth, wherein $1 \leq W1/W2 \leq 2$, where W1 is a radial width of the back yoke and W2 is the circumferential width of the small-width teeth.

2. The armature as set forth in claim 1, wherein the small-width teeth also have the armature coil concentratedly wound thereon, and
    the armature coil is comprised of a plurality of phase windings that are arranged in the circumferential direction of the armature core in a predetermined sequence.

3. The armature as set forth in claim 2, wherein $0 < N2 \leq N1$, where N1 is the number of turns of the armature coil on each of the large-width teeth and N2 is the number of turns of the armature coil on each of the small-width teeth.

4. The armature as set forth in claim 1, wherein $1.5 \leq W3/W2 \leq 2.7$, where W3 is the circumferential width of the large-width teeth.

5. The armature as set forth in claim 4, wherein:
    W2 is a minimum circumferential width of the small-width teeth; and
    W3 is a minimum circumferential width of the large-width teeth.

6. The armature as set forth in claim 4, wherein:
    each of the plurality of small-width teeth includes a first enlarged collar at the free end;
    each of the plurality of large-width teeth includes a second enlarged collar at the free end;
    W2 is the circumferential width of the small-width teeth exclusive of the first enlarged collar; and
    W3 is the circumferential width at the large-width teeth exclusive of the second enlarged collar.

7. The armature as set forth in claim 1, wherein each of the large-width teeth has at least one groove formed in a distal end surface thereof so as to extend in an axial direction of the armature core.

8. The armature as set forth in claim 7, wherein for each of the large-width teeth, the least one groove formed in the distal end surface of the large-width tooth comprises a plurality of grooves that are arranged at a predetermined angular pitch in the circumferential direction of the armature core, and
    $\theta p = 360°/(p \times m)$, where $\theta p$ is the predetermined angular pitch in mechanical angle, p is the number of poles and m is the number of phases of the armature coil.

9. The armature as set forth in claim 7, wherein the armature is configured to be arranged in a rotating electric machine to face a rotor of the rotating electric machine through a gap formed therebetween, and
    for each of the large-width teeth, the least one groove formed in the distal end surface of the large-width tooth has a depth greater than or equal to the size of the gap between the armature and the rotor.

10. The armature as set forth in claim 9, wherein for each of the large-width teeth, the least one groove formed in the distal end surface of the large-width tooth has a circumferential width greater than or equal to twice the size of the gap between the armature and the rotor.

11. The armature as set forth in claim 1, wherein the armature core further includes a plurality of slots in which the armature coil is received,
    each of the slots is formed between one circumferentially-adjacent pair of the large-width and small-width teeth and has an opening at a radial end thereof on an opposite side to the back yoke, and $180°/(p \times m) \leq \theta \leq 360°/(p \times m)$ where p is the number of poles, m is the number of phases of the armature coil and $\theta$ is an opening angle of each of the openings of the slots in mechanical angle.

12. The armature as set forth in claim 1, wherein the armature coil is wound in an alpha winding manner.

13. The armature as set forth in claim 1, wherein:
    each of the plurality of small-width teeth has a first circumferential width at a first junction of the each of the plurality of small-width teeth and the back yoke and each of the plurality of large-width teeth has a second circumferential width at a second junction of the each of the plurality of large-width teeth and the back yoke; and the second circumferential width is larger than the first circumferential width.

14. The armature as set forth in claim 1, wherein windings of the multi-phase armature coil are sequentially and repeatedly arranged in phase sequence in slots formed between the plurality of small-width teeth and the plurality of large-width teeth.

15. A rotating electric machine comprising:
the armature as set forth in claim 1; and
a rotor disposed to face the armature through a gap formed therebetween.

* * * * *